US012634684B2

(12) United States Patent
Kumagai et al.

(10) Patent No.: US 12,634,684 B2
(45) Date of Patent: May 19, 2026

(54) MEASUREMENT DEVICE

(71) Applicant: OMRON HEALTHCARE CO., LTD., Muko (JP)

(72) Inventors: Kazuki Kumagai, Kyoto (JP); Nobuo Kubo, Kyoto (JP); Nozomi Nakawaki, Kyoto (JP); Yasunori Fukuda, Kyoto (JP)

(73) Assignee: OMRON HEALTHCARE CO., LTD., Kyoto (JP)

( * ) Notice: Subject to any disclaimer, the term of this patent is extended or adjusted under 35 U.S.C. 154(b) by 298 days.

(21) Appl. No.: 18/592,001

(22) Filed: Feb. 29, 2024

(65) Prior Publication Data

US 2024/0205683 A1 Jun. 20, 2024

Related U.S. Application Data

(63) Continuation of application No. PCT/JP2023/009364, filed on Mar. 10, 2023.

(30) Foreign Application Priority Data

Aug. 24, 2022 (JP) ................................. 2022-133178

(51) Int. Cl.
*H04W 12/03* (2021.01)
(52) U.S. Cl.
CPC .................................. *H04W 12/03* (2021.01)
(58) Field of Classification Search
CPC ......... H04W 12/03; H04W 4/38; H04W 4/80; H04W 12/50; H04W 84/18; H04W 84/10; G16H 40/67; G16H 50/20; G16H 50/30
See application file for complete search history.

(56) References Cited

U.S. PATENT DOCUMENTS

| | | | | |
|---|---|---|---|---|
| 10,771,458 B1 * | 9/2020 | Xia | ....................... | H04W 12/64 |
| 2005/0266798 A1 * | 12/2005 | Moloney | ............... | H04W 12/02 |
| | | | | 455/410 |
| 2015/0149216 A1 | 5/2015 | Suzuki et al. | | |

(Continued)

FOREIGN PATENT DOCUMENTS

| | | | |
|---|---|---|---|
| CN | 102026187 A | * | 4/2011 |
| EP | 2536185 A2 | | 12/2012 |

(Continued)

OTHER PUBLICATIONS

Official Communication issued in International Patent Application No. PCT/JP2023/009364, mailed on May 16, 2023.

(Continued)

*Primary Examiner* — Fayyaz Alam
(74) *Attorney, Agent, or Firm* — Keating & Bennett, LLP

(57) ABSTRACT

A measurement device includes: a short-range wireless communication interface; a processor; and a storage. In a state where a communication connection with an information terminal using short-range wireless communication is established, the processor receives, from the information terminal, user information specifying a user of the information terminal, shares, with the information terminal, encryption information for performing encryption communication using short-range wireless communication, and stores the encryption information and the user information in the storage in association with each other.

5 Claims, 9 Drawing Sheets

(56) References Cited

U.S. PATENT DOCUMENTS

| | | |
|---|---|---|
| 2016/0354033 A1 | 12/2016 | Ouchi et al. |
| 2017/0013104 A1 | 1/2017 | Tinuma |
| 2017/0136834 A1 | 5/2017 | Chong et al. |
| 2017/0208425 A1* | 7/2017 | Fu ........................ H04L 63/107 |
| 2017/0255423 A1 | 9/2017 | Yoshida |
| 2017/0303119 A1 | 10/2017 | Ogura et al. |

FOREIGN PATENT DOCUMENTS

| | | |
|---|---|---|
| JP | 2015-104415 A | 6/2015 |
| JP | 2015-150375 A | 8/2015 |
| JP | 2017-016578 A | 1/2017 |
| JP | 2017-089236 A | 5/2017 |
| JP | 2017-520451 A | 7/2017 |
| JP | 2017-158124 A | 9/2017 |
| JP | 2017-192117 A | 10/2017 |
| JP | 2019-033450 A | 2/2019 |

OTHER PUBLICATIONS

Official Communication issued in corresponding Indian Patent Application No. 202417015000, mailed on Mar. 12, 2026, 8 pages.

* cited by examiner

| USER INFORMATION | ENCRYPTION INFORMATION | SMARTPHONE INDIVIDUAL IDENTIFICATION INFORMATION |
|---|---|---|
| USER A | INFA | IDa |
| USER B | INFB | IDb |
| USER C | INFC | IDc |
| USER D | INFD | IDd |

20A

| USER INFORMATION | ENCRYPTION INFORMATION | SPHYGMOMANOMETER INDIVIDUAL IDENTIFICATION INFORMATION |
|---|---|---|
| USER A | INFA | IDA |

20B

| USER INFORMATION | ENCRYPTION INFORMATION | SPHYGMOMANOMETER INDIVIDUAL IDENTIFICATION INFORMATION |
|---|---|---|
| USER B | INFB | IDA |

20C

| USER INFORMATION | ENCRYPTION INFORMATION | SPHYGMOMANOMETER INDIVIDUAL IDENTIFICATION INFORMATION |
|---|---|---|
| USER C | INFC | IDA |

20D

| USER INFORMATION | ENCRYPTION INFORMATION | SPHYGMOMANOMETER INDIVIDUAL IDENTIFICATION INFORMATION |
|---|---|---|
| USER D | INFD | IDA |

*FIG. 4*

<SCREEN DISPLAY>

PLEASE PERFORM USER REGISTRATION

PLEASE PRESS COMMUNICATION BUTTON OF SPHYGMOMANOMETER

TO UPDATE TERMINAL TO BE REGISTERED FOR USER A?

REGISTRATION TO SPHYGMOMANOMETER IS COMPLETED

<SMARTPHONE>

DISPLAY REGISTRATION SCREEN — S11

STORE INPUT USER INFORMATION (USER A) — S12

REGISTER ENCRYPTION INFORMATION — S16

S13 (PERFORM CONNECTION)

S20 (SHARE ENCRYPTION INFORMATION)

S14 (TRANSMIT USER INFORMATION (USER A))

S3 (PERFORM NOTIFICATION THAT USER IS REGISTERED)

S15 (ISSUE UPDATE REQUEST)

S17 (PERFORM DISCONNECTING)

<SPHYGMOMANOMETER>

DETECT PRESSING OF COMMUNICATION BUTTON — S1

S2 (PERFORM ADVERTISING)

OVERWRITE ENCRYPTION INFORMATION CORRESPONDING TO USER A — S4a

| USER INFORMATION | ENCRYPTION INFORMATION | SMARTPHONE INDIVIDUAL IDENTIFICATION INFORMATION |
|---|---|---|
| USER A | INFG | IDg |
| USER B | INFB | IDb |
| USER C | INFC | IDc |
| USER D | INFD | IDd |

20G

| USER INFORMATION | ENCRYPTION INFORMATION | SPHYGMOMANOMETER INDIVIDUAL IDENTIFICATION INFORMATION |
|---|---|---|
| USER A | INFG | IDA |

20A

| USER INFORMATION | ENCRYPTION INFORMATION | SPHYGMOMANOMETER INDIVIDUAL IDENTIFICATION INFORMATION |
|---|---|---|
| USER A | INFA | IDA |

20B

| USER INFORMATION | ENCRYPTION INFORMATION | SPHYGMOMANOMETER INDIVIDUAL IDENTIFICATION INFORMATION |
|---|---|---|
| USER B | INFB | IDA |

20C

| USER INFORMATION | ENCRYPTION INFORMATION | SPHYGMOMANOMETER INDIVIDUAL IDENTIFICATION INFORMATION |
|---|---|---|
| USER C | INFC | IDA |

20D

| USER INFORMATION | ENCRYPTION INFORMATION | SPHYGMOMANOMETER INDIVIDUAL IDENTIFICATION INFORMATION |
|---|---|---|
| USER D | INFD | IDA |

| USER INFORMATION | ENCRYPTION INFORMATION | SMARTPHONE INDIVIDUAL IDENTIFICATION INFORMATION |
|---|---|---|
| USER A | INFA | IDa |
| | INFG | IDg |
| USER B | INFB | IDb |
| USER C | INFC | IDc |
| USER D | INFD | IDd |

20A

| USER INFORMATION | ENCRYPTION INFORMATION | SPHYGMOMANOMETER INDIVIDUAL IDENTIFICATION INFORMATION |
|---|---|---|
| USER A | INFA | IDA |

20G

| USER INFORMATION | ENCRYPTION INFORMATION | SPHYGMOMANOMETER INDIVIDUAL IDENTIFICATION INFORMATION |
|---|---|---|
| USER A | INFG | IDA |

20B

| USER INFORMATION | ENCRYPTION INFORMATION | SPHYGMOMANOMETER INDIVIDUAL IDENTIFICATION INFORMATION |
|---|---|---|
| USER B | INFB | IDA |

20C

| USER INFORMATION | ENCRYPTION INFORMATION | SPHYGMOMANOMETER INDIVIDUAL IDENTIFICATION INFORMATION |
|---|---|---|
| USER C | INFC | IDA |

20D

| USER INFORMATION | ENCRYPTION INFORMATION | SPHYGMOMANOMETER INDIVIDUAL IDENTIFICATION INFORMATION |
|---|---|---|
| USER D | INFD | IDA |

FIG. 8

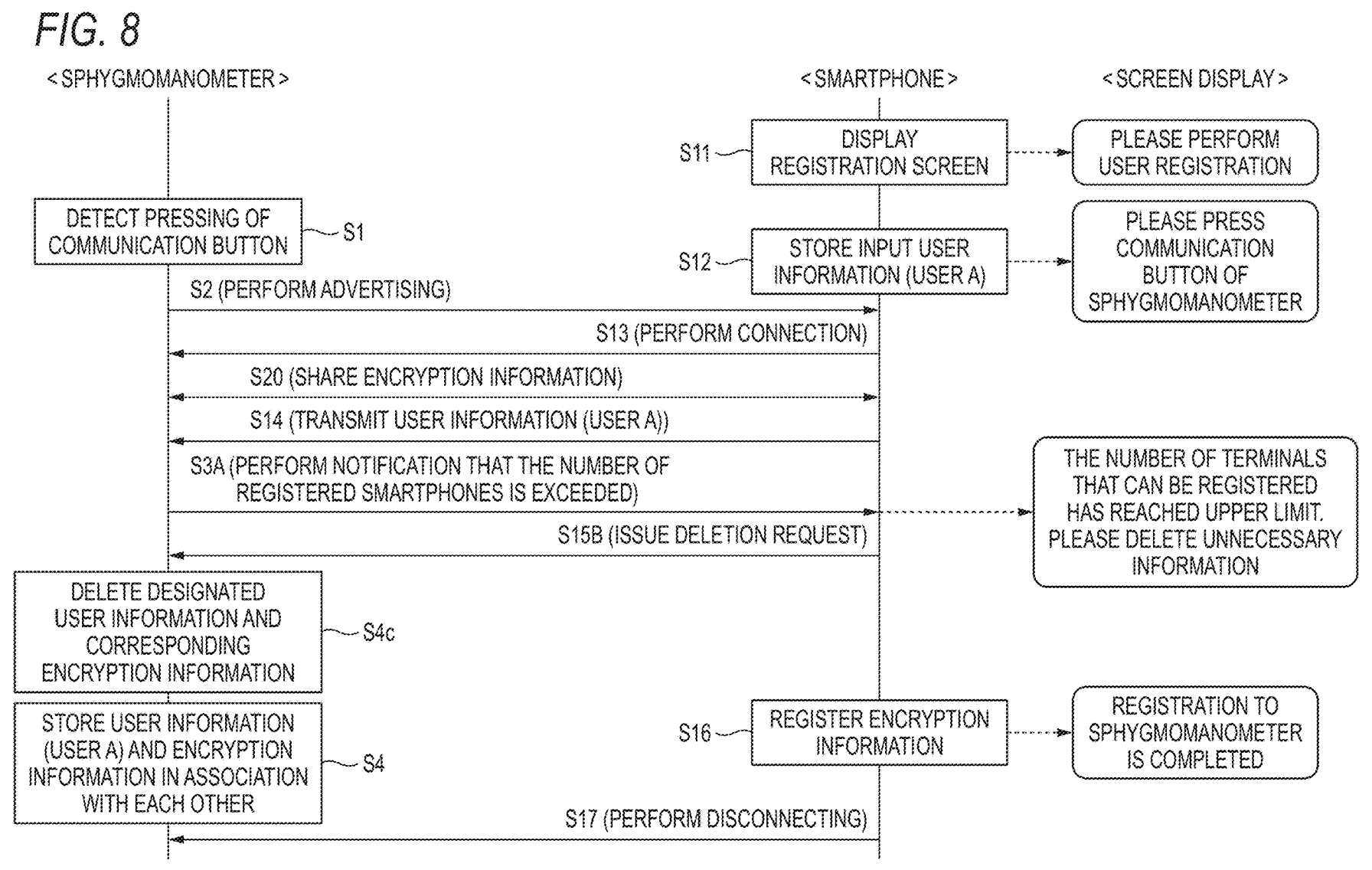

< SCREEN DISPLAY >

PLEASE PERFORM USER REGISTRATION

PLEASE PRESS COMMUNICATION BUTTON OF SPHYGMOMANOMETER

THE NUMBER OF TERMINALS THAT CAN BE REGISTERED HAS REACHED UPPER LIMIT. PLEASE DELETE UNNECESSARY INFORMATION

REGISTRATION TO SPHYGMOMANOMETER IS COMPLETED

< SMARTPHONE >

S11  DISPLAY REGISTRATION SCREEN

S12  STORE INPUT USER INFORMATION (USER A)

S13 (PERFORM CONNECTION)

S20 (SHARE ENCRYPTION INFORMATION)

S14 (TRANSMIT USER INFORMATION (USER A))

S15B (ISSUE DELETION REQUEST)

S16  REGISTER ENCRYPTION INFORMATION

S17 (PERFORM DISCONNECTING)

< SPHYGMOMANOMETER >

S1  DETECT PRESSING OF COMMUNICATION BUTTON

S2 (PERFORM ADVERTISING)

S3A (PERFORM NOTIFICATION THAT THE NUMBER OF REGISTERED SMARTPHONES IS EXCEEDED)

S4c  DELETE DESIGNATED USER INFORMATION AND CORRESPONDING ENCRYPTION INFORMATION

S4  STORE USER INFORMATION (USER A) AND ENCRYPTION INFORMATION IN ASSOCIATION WITH EACH OTHER

| USER INFORMATION | ENCRYPTION INFORMATION | SMARTPHONE INDIVIDUAL IDENTIFICATION INFORMATION |
|---|---|---|
| USER X | INFA | IDa |
| USER B | INFB | IDb |
| USER C | INFC | IDc |
| USER D | INFD | IDd |

20A

| USER INFORMATION | ENCRYPTION INFORMATION | SPHYGMOMANOMETER INDIVIDUAL IDENTIFICATION INFORMATION |
|---|---|---|
| USER X | INFA | IDA |

20B

| USER INFORMATION | ENCRYPTION INFORMATION | SPHYGMOMANOMETER INDIVIDUAL IDENTIFICATION INFORMATION |
|---|---|---|
| USER B | INFB | IDA |

20C

| USER INFORMATION | ENCRYPTION INFORMATION | SPHYGMOMANOMETER INDIVIDUAL IDENTIFICATION INFORMATION |
|---|---|---|
| USER C | INFC | IDA |

20D

| USER INFORMATION | ENCRYPTION INFORMATION | SPHYGMOMANOMETER INDIVIDUAL IDENTIFICATION INFORMATION |
|---|---|---|
| USER D | INFD | IDA |

MEASUREMENT DEVICE

CROSS-REFERENCE TO RELATED APPLICATIONS

This application is a continuation of PCT application No. PCT/JP2023/009364, which was filed on Mar. 10, 2023 based on Japanese Patent Application No. 2022-133178 filed on Aug. 24, 2022, the contents of which are incorporated herein by way of reference.

BACKGROUND

The present disclosure relates to a measurement device.

A measurement device in the present disclosure may include a biological information measurement device that measures biological information such as a body weight, a body composition, a blood pressure, a pulse, a heart rate, a body temperature, blood sugar, or a blood oxygen saturation level, and an activity amount measurement device that measures an activity amount such as a number of steps, a walking distance, or burned calories. The measurement device includes a measurement sensor for measuring an amount to be measured. The amount to be measured by the measurement sensor includes biological information such as a body weight, a body fat percentage, a blood pressure value, a pulse rate, a heart rate, a body temperature, a blood sugar level, or a blood oxygen saturation level, and an activity amount such as a number of steps, a running distance, or burned calories, depending on the measurement device. A measurement result of such a measurement device is recorded and analyzed using an information terminal such as a smartphone, a tablet terminal, a notebook computer, or a desktop computer.

When such the measurement result is recorded and analyzed, it is desirable that the measurement device and the information terminal are communicably connected so that the information terminal may automatically acquire the measurement result, rather than having a user input the measurement result into the information terminal each time. Specifically, for example, a method or the like in which the information terminal receives the measurement result from the measurement device by short-range wireless communication such as Bluetooth (registered trademark) is considered.

JP2017-089236A describes a toilet device that deletes identification information on a portable information terminal with the oldest paired date and time every time the number of paired portable information terminals reaches a predetermined value.

JP2017-158124A describes a multifunction device that, when receiving a pairing release request, saves encryption key information corresponding to a portable terminal that is a request source from a storage unit to a storage area and deletes the encryption key information, and forms a space in the storage unit in which one piece of encryption key information may be stored.

In order to perform secure short-range wireless communication between the measurement device and the information terminal, a process of pairing the measurement device and the information terminal is necessary. The pairing refers to a process of sharing and registering, between the measurement device and the information terminal, encryption information for performing encryption communication using short-range wireless communication. The measurement device requires a storage unit for storing the encryption information. In general, the measurement device may perform the pairing with a plurality of information terminals. However, if a capacity of the storage unit that stores the encryption information is limited, it is necessary to delete the already stored encryption information in order to perform the pairing with a certain number or more of information terminals. For example, when a method of deleting the oldest one of the stored encryption information is adopted as in JP2017-089236A, the encryption information is deleted regardless of an intention of a user.

Aspects of the present disclosure relates to providing a measurement device capable of appropriately managing encryption information.

SUMMARY

According to an aspect of the present disclosure, there is provided a measurement device, including:

a short-range wireless communication interface;

a processor; and a storage, in which in a state where a communication connection with an information terminal using short-range wireless communication is established, the processor receives, from the information terminal, user information specifying a user of the information terminal, shares, with the information terminal, encryption information for performing encryption communication using short-range wireless communication, and stores the encryption information and the user information in the storage in association with each other.

BRIEF DESCRIPTION OF DRAWINGS

FIG. 3 is a schematic diagram showing an example of information stored in storage units of the sphygmomanometer 10 and smartphones 20A to 20D paired thereto;

FIG. 4 is a sequence chart showing a procedure of a process when a user whose user information is stored in the sphygmomanometer 10 pairs a new smartphone 20G with the sphygmomanometer 10;

FIG. 5 is a schematic diagram showing an example of information stored in the storage units of the sphygmomanometer 10 and the smartphones 20A to 20D according to the process of FIG. 4;

FIG. 7 is a schematic diagram showing an example of information stored in the storage units of the sphygmomanometer 10 and the smartphone 20 according to the process of FIG. 6;

FIG. 8 is a sequence chart showing a procedure of a process when a number of smartphones 20 exceeding a predetermined number are paired with the sphygmomanometer 10; and FIG. 9 is a schematic diagram showing an example of information stored in the storage units of the sphygmomanometer 10 and the smartphone 20 according to a process of changing the user information.

DESCRIPTION OF EMBODIMENTS

Overview of Measurement Device and Information Terminal of Embodiment

A measurement device according to the present embodiment and an information terminal may communicate with each other using short-range wireless communication. In a state where a communication connection between the information terminal and the measurement device using the short-range wireless communication is established, the measurement device receives, from the information terminal, user information specifying a user of the information terminal, shares, with the information terminal, encryption information for performing encryption communication using short-range wireless communication, and stores the encryption information and the user information in a storage unit in association with each other. In this way, in the measurement device, since the user information and the encryption information are stored in association with each other, the encryption information may be managed on a user-by-user basis. For example, encryption information corresponding to specific user information may be rewritten, or new encryption information may be stored in association with the user information. Therefore, even when, for example, a capacity of the storage unit is limited, the encryption information may be appropriately edited according to an intention of the user, and the encryption information may be appropriately managed.

Hereinafter, a configuration example of a management system 100 including the measurement device and the information terminal according to the present embodiment will be described.

System Configuration

Figure 1:
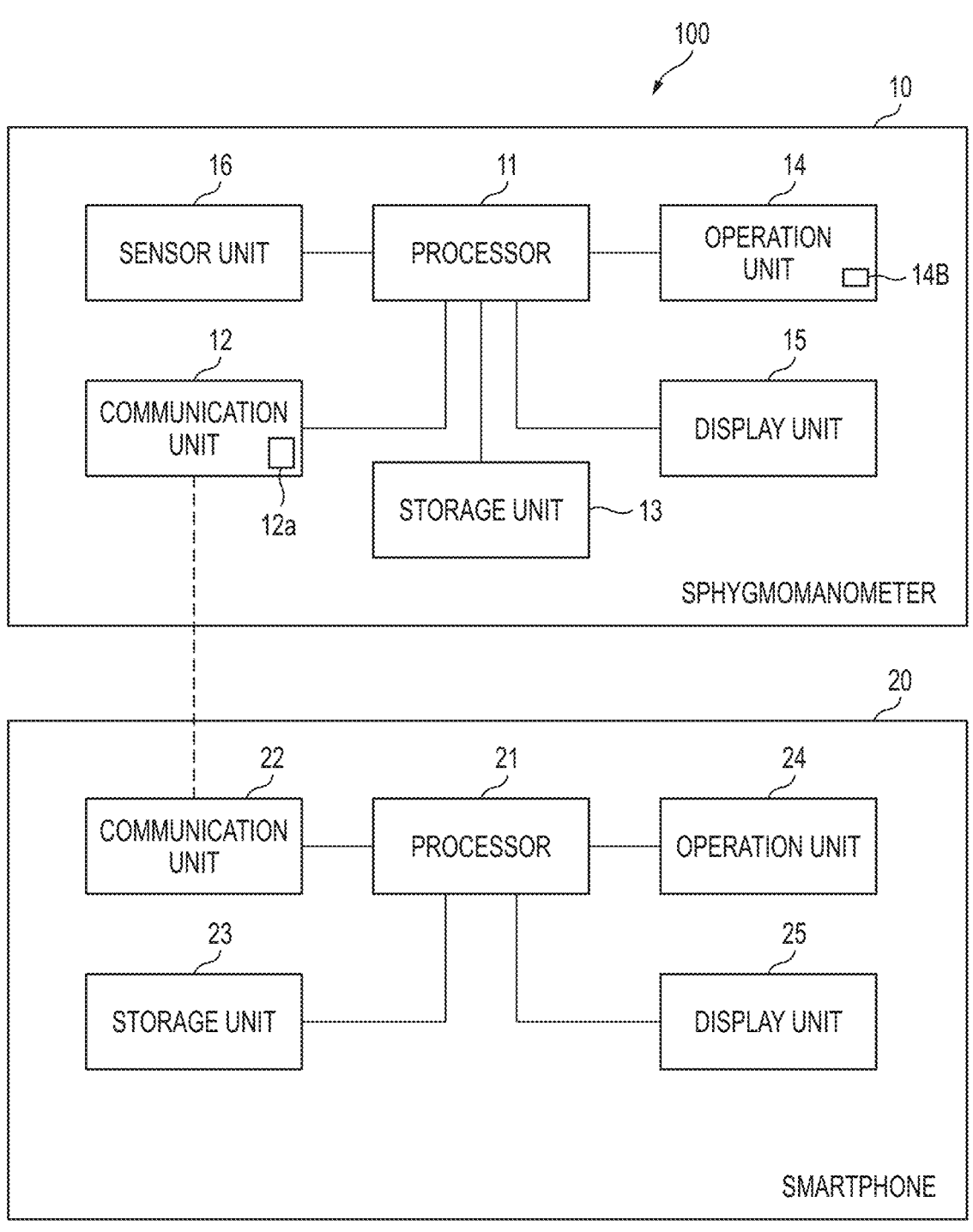
FIG. 1 is a schematic diagram showing a schematic configuration of a management system 100.

FIG. 1 is a schematic diagram showing a schematic configuration of the management system 100. The management system 100 includes a sphygmomanometer 10, which is an example of the measurement device, and a smartphone 20, which is an example of the information terminal, and is a system for managing measurement data, programs, and the like of the sphygmomanometer 10 by using the smartphone 20. The sphygmomanometer 10 and the smartphone 20 are configured to be able to communicate with each other using short-range wireless communication. A method of the short-range wireless communication is not particularly limited, and for example, methods such as Wi-Fi (registered trademark), ANT, Bluetooth (registered trademark), or infrared communication may be adopted. Hereinafter, the method of the short-range wireless communication is described as Bluetooth (registered trademark). Hereinafter, an owner who owns both the sphygmomanometer 10 and the smartphone 20 will be referred to as a user.

(Measurement Device)

The sphygmomanometer 10 includes a processor 11, a communication unit 12, a storage unit 13, an operation unit 14, a display unit 15, and a sensor unit 16.

The sensor unit 16 includes a pressure sensor disposed in a cuff portion of the sphygmomanometer 10 as a measurement sensor, and uses the pressure sensor to detect a pulse wave from blood vessels of the user under an appropriate cuff pressure. The sphygmomanometer 10 may calculate blood pressure information including a systolic blood pressure, a diastolic blood pressure, and a pulse based on the pulse wave detected by the sensor unit 16.

The communication unit 12 is a communication interface for performing short-range wireless communication, and includes a communication antenna and various circuits.

The storage unit 13 includes a work memory such as a random access memory (RAM) and a non-transitory storage medium such as a flash memory. The storage medium stores various information such as measured blood pressure information.

The operation unit 14 is an input unit such as a button or a touch panel that receives an input from the user, and receives various operations such as turning on/off a power, starting measurement of blood pressure information, and selecting an item from the user. The operation unit 14 includes a communication button 14B for activating the communication unit 12 (enabling short-range wireless communication). The communication button 14B may be a hardware button or a software button displayed on the display unit 15 on which the touch panel is mounted.

The display unit 15 includes, for example, an organic electro-luminescence (EL) display or a liquid crystal display, and displays the measured blood pressure information or the like.

The processor 11 integrally controls each unit of the sphygmomanometer 10. The processor 11 is, for example, a central processing unit (CPU) that is a general-purpose processor that executes software (program) to perform various functions, a programmable logic device (PLD) that is a processor whose circuit configuration may be changed after manufacture of a field programmable gate array (FPGA) or the like, or a dedicated electric circuit that is a processor having a circuit configuration specifically designed to execute a specific process, such as an application specific integrated circuit (ASIC). The processor 11 may be implemented by one processor, or may be implemented by a combination of two or more processors of the same type or different types (for example, a plurality of FPGAs or a combination of a CPU and an FPGA). For example, the processor 11 may include a processor that controls communication using the communication unit 12 and a processor that performs various controls other than the communication. More specifically, a hardware structure of the processor 11 is an electric circuit (circuitry) in which circuit elements such as semi-conductor elements are combined.

When the processor 11 detects pressing of a measurement start button (not shown) included in the operation unit 14, the processor 11 receives an instruction to start measurement, applies a pressure to the cuff, and calculates blood pressure information based on a pulse wave detected by the sensor unit 16 under an appropriate cuff pressure. Then, the processor 11 causes the display unit 15 to display the calculated blood pressure information. The processor 11 controls each component of the sphygmomanometer 10 so as to execute a process according to an operation performed by the user via the operation unit 14. When the processor 11 detects pressing of the communication button 14B included in the operation unit 14, the processor 11 activates the communication unit 12.

Although FIG. 1 shows the sphygmomanometer 10 as an example of the measurement device, the sphygmomanometer 10 may be replaced with a body weight scale, a body composition meter, a pulse meter, a heart rate meter, a body temperature meter, a blood sugar meter, a pulse oximeter, an activity amount meter, or the like. In any of these measurement devices, the sensor unit 16 includes various measurement sensors (pressure sensor, pulse wave sensor, blood sugar sensor, photoelectric sensor, temperature sensor, acceleration sensor, or the like) for measuring a physical quantity to be measured. In a case where the measurement device is a biological information measurement device, when the processor 11 detects the pressing of the measurement start button included in the operation unit 14, the processor 11 activates the measurement sensor (pressure sensor, pulse wave sensor, blood sugar sensor, photoelectric sensor, temperature sensor, or the like) included in the sensor unit 16 to measure biological information.

(Information Terminal)

The smartphone 20 includes a processor 21, a communication unit 22, a storage unit 23, an operation unit 24, and a display unit 25.

The communication unit 22 is a communication interface for performing short-range wireless communication, and includes a communication antenna and various circuits.

The storage unit 23 includes a work memory such as a RAM and a non-transitory storage medium such as a flash memory. The storage medium stores various information including an application program (operation program of the information terminal).

The operation unit 24 is an input unit such as a button or a touch panel that receives an input from the user, and receives various operations from the user.

The display unit 25 includes, for example, an organic EL display or a liquid crystal display.

The processor 21 integrally controls each unit of the smartphone 20. Like the processor 11, the processor 21 is implemented by one or more processors. The processor 21 executes various programs stored in the storage unit 23 to perform functions corresponding to these programs.

(Pairing Method for Sphygmomanometer and Smartphone)

Figure 2:
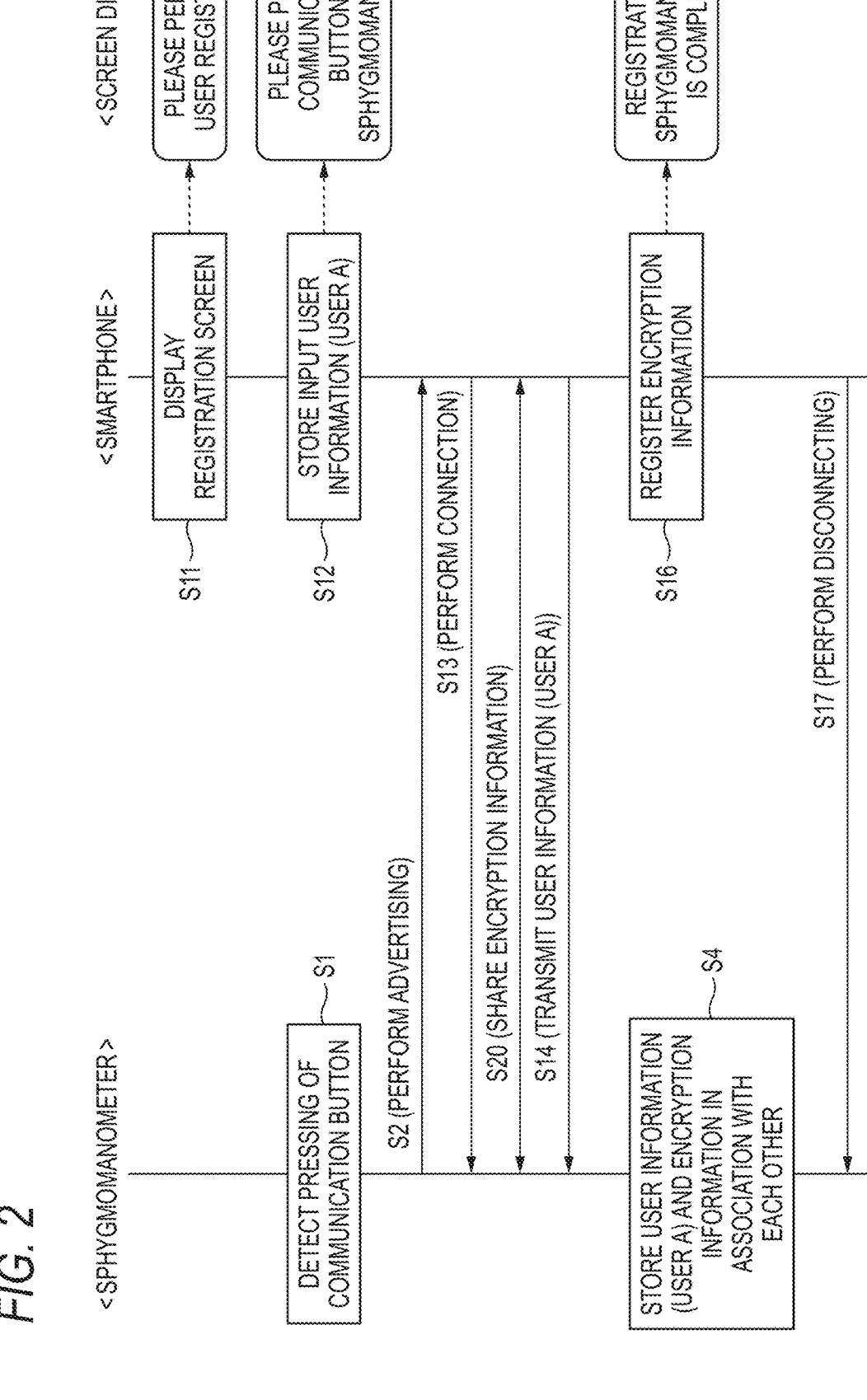
FIG. 2 is a sequence chart showing a procedure of a process of pairing a sphygmomanometer 10 and a smartphone 20.

Next, a pairing method for the sphygmomanometer 10 and the smartphone 20 will be described. FIG. 2 is a sequence chart showing a procedure of a process of pairing the sphygmomanometer 10 and the smartphone 20. An example of a message displayed on the display unit 25 of the smartphone 20 is shown at a right end of FIG. 2. It is assumed that a management application for managing blood pressure information is installed and stored in advance in the storage unit 23 of the smartphone 20.

The user activates the management application by operating the smartphone 20. When the management application is activated, the processor 21 of the smartphone 20 causes the display unit 25 to display a registration screen (step S11). The processor 21 causes the communication unit 22 to start scanning. The scanning means that the communication unit 22 is in a receiving state and acquires information on surrounding devices.

The registration screen displayed in step S11 includes, for example, a message "PLEASE PERFORM USER REGISTRATION" as shown in FIG. 2. When the user confirms the message, the user operates the operation unit 24 of the smartphone 20 to input information such as his/her name or nickname as user information for specifying a user of the smartphone 20. The processor 21 stores the input user information (for example, "user A") in the storage unit 23 (step S12), and completes the user registration. When the user registration is completed, the processor 21 causes the display unit 25 to display, for example, a message "PLEASE PRESS COMMUNICATION BUTTON OF SPHYGMO-MANOMETER" as shown in FIG. 2. The user who confirms the message prepares the sphygmomanometer 10 to be paired, turns on a power of the sphygmomanometer 10, and presses the communication button 14B included in the operation unit 14 of the sphygmomanometer 10.

When the processor 11 of the sphygmomanometer 10 detects the pressing of the communication button 14B (step S1), the processor 11 activates the communication unit 12 and causes the communication unit 12 to start advertising (step S2). The "advertising" refers to periodically transmitting a packet on an advertising channel.

When the processor 21 of the smartphone 20 acquires the packet transmitted from the sphygmomanometer 10 on the advertising channel, the processor 21 issues a connection request to the sphygmomanometer 10 via the communication unit 22 (step S13). When the processor 11 of the sphygmomanometer 10 responds to the connection request via the communication unit 12, a communication connection using short-range wireless communication is established between the sphygmomanometer 10 and the smartphone 20.

When the communication connection between the smartphone 20 and the sphygmomanometer 10 is established, mutual authentication between the smartphone 20 and the sphygmomanometer 10 is performed by a predetermined method, and when the mutual authentication is completed, encryption information (for example, an encryption key) for performing encryption communication using short-range wireless communication is shared between the smartphone 20 and the sphygmomanometer 10 (step S20). The sharing of the encryption information means that the processor 11 of the sphygmomanometer 10 generates encryption information and transmits the encryption information to the smartphone 20. The processor 21 of the smartphone 20 may generate encryption information and transmit the encryption information to the sphygmomanometer 10 so as to share the encryption information.

When the encryption information is shared between the sphygmomanometer 10 and the smartphone 20 by the process of step S20, the processor 21 of the smartphone 20 transmits the user information (here, "user A") stored in step S12 to the sphygmomanometer 10 (step S14). The order of step S14 and step S20 may be reversed or may be performed in parallel.

The processor 11 of the sphygmomanometer 10 that receives the user information stores the received user information, the encryption information shared in step S20, and individual identification information on the smartphone 20 (hereinafter, referred to as smartphone individual identification information) acquired at any timing after the establishment of the communication connection with the smartphone 20 in the storage unit 13 in association with each other (step S4).

On the other hand, the processor 21 of the smartphone 20 that transmits the user information in step S14 stores the encryption information shared in step S20 and individual identification information on the sphygmomanometer 10 (hereinafter, referred to as sphygmomanometer individual identification information) acquired at any timing after the establishment of the communication connection with the sphygmomanometer 10 in the storage unit 23 in association with each other (step S16).

After step S16, the processor 21 of the smartphone 20 causes, for example, the display unit 25 to display a message indicating that the pairing is completed, such as "REGISTRATION TO SPHYGMOMANOMETER IS COMPLETED".

Thereafter, the processor 21 of the smartphone 20 disconnects the communication connection with the sphygmomanometer 10 (step S17). Thereafter, secure communication using the encryption information may be performed between the smartphone 20 and the sphygmomanometer 10.

For example, it is assumed that there are four users A, B, C, and D who use the sphygmomanometer 10. Hereinafter, the smartphone 20 owned by the user A and whose smartphone individual identification information is "IDa" is referred to as a smartphone 20A, the smartphone 20 owned by the user B and whose smartphone individual identification information is "IDb" is referred to as a smartphone 20B, the smartphone 20 owned by the user C and whose smartphone individual identification information is "IDc" is referred to as a smartphone 20C, and the smartphone 20 owned by the user D and whose smartphone individual identification information is "IDd" is referred to as a smartphone 20D.

When the user A completes pairing with the sphygmomanometer 10 using the smartphone 20A, the user B completes pairing with the sphygmomanometer 10 using the smartphone 20B, the user C completes pairing with the sphygmomanometer 10 using the smartphone 20C, and the user D completes pairing with the sphygmomanometer 10 using the smartphone 20D, information stored in the storage unit 13 of the sphygmomanometer 10 and the storage units 23 of the smartphones 20A to 20D is as shown in FIG. 3.

As shown in FIG. 3, in the storage unit 13 of the sphygmomanometer 10, user information "user A", encryption information "INFA", and the smartphone individual identification information "IDa" are stored in association with each other, user information "user B", encryption information "INFB", and the smartphone individual identification information "IDb" are stored in association with each other, user information "user C", encryption information "INFC", and the smartphone individual identification information "IDc" are stored in association with each other, and user information "user D", encryption information "INFD", and the smartphone individual identification information "IDd" are stored in association with each other.

In the storage unit 23 of the smartphone 20A, the user information "user A", the encryption information "INFA", and sphygmomanometer individual identification information "IDA" are stored in association with each other.

In the storage unit 23 of the smartphone 20B, the user information "user B", the encryption information "INFB", and the sphygmomanometer individual identification information "IDA" are stored in association with each other.

In the storage unit 23 of the smartphone 20C, the user information "user C", the encryption information "INFC", and the sphygmomanometer individual identification information "IDA" are stored in association with each other.

In the storage unit 23 of the smartphone 20D, the user information "user D", the encryption information "INFD", and the sphygmomanometer individual identification information "IDA" are stored in association with each other.

A case will be described in which the user A changes the owned smartphone 20A to the smartphone 20G having individual identification information "IDg" in a state where the information is stored as shown in FIG. 3. FIG. 4 is a sequence chart showing a procedure of a process when the user whose user information is stored in the sphygmomanometer 10 pairs the new smartphone 20G with the sphygmomanometer 10. In FIG. 4, the processes up to step S14 are the same as those in FIG. 3.

When the processor 11 of the sphygmomanometer 10 receives the user information "user A" from the smartphone 20G, the processor notifies the smartphone 20G that the user information is already stored in the storage unit 23 (step S3). Upon receiving the notification, the processor 21 of the smartphone 20G causes the display unit 25 to display, for example, a message "TO UPDATE TERMINAL TO BE REGISTERED FOR USER A?". When the user A who views this display performs an operation of instructing to update the terminal, the processor 21 of the smartphone 20G issues an update request for the encryption information corresponding to the user information "user A" to the sphygmomanometer 10 (step S15).

The processor 11 of the sphygmomanometer 10 that receives the update request overwrites the encryption information "INFA" in association with the user information "user A" with encryption information (here, "INFG") shared in step S20. The processor 11 of the sphygmomanometer 10 updates the smartphone individual identification information corresponding to the user information "user A" from "IDa" that is the individual identification information on the smartphone 20A to "IDg" that is the individual identification information on the smartphone 20G.

On the other hand, after step S15, the processor 21 of the smartphone 20G stores the encryption information "INFG" shared in step S20 and the sphygmomanometer individual identification information "IDA" in the storage unit 23 (step S16), and then disconnects the connection with the sphygmomanometer 10 (step S17).

Through the above process, the information stored in the storage unit 13 of the sphygmomanometer 10 is updated from the state shown in FIG. 3 to the state shown in FIG. 5. Accordingly, the encryption communication cannot be performed between the smartphone 20A and the sphygmomanometer 10, and instead, the encryption communication may be performed between the smartphone 20G and the sphygmomanometer 10.

The process of FIG. 4 may be changed as follows. First, the process of step S12 is changed to a process of confirming whether the user registration to the sphygmomanometer 10 is completed (that is, the user registration is performed with another smartphone in the past). Then, when the user A performs an operation indicating that the user registration is completed, between step S13 and step S20 or between step S20 and step S14, the processor 21 of the smartphone 20G acquires, from the sphygmomanometer 10, a list of the user information stored in the storage unit 13 of the sphygmomanometer 10, causes the display unit 25 to display the acquired list, and prompts selection of the already registered user information. When the "user A" is selected by the user A from the list of the user information displayed on the display unit 25, the processor 21 transmits the user information "user A" to the sphygmomanometer 10 in step S14, and further issues an update request for the encryption information corresponding to the user information "user A" in step S15. In this modification, step S3 is deleted. In this modification, the transmission of the list of the user information from the sphygmomanometer 10 to the smartphone 20G may be performed by encryption communication using the encryption information shared in step S20.

As described above, in the management system 100, the encryption information corresponding to the existing specific user information may be overwritten with new encryption information in the storage unit 13 of the sphygmomanometer 10. Therefore, when a storage area for storing a set of the user information, the encryption information, and the smartphone individual identification information is exhausted, it is possible to prevent the encryption information that is not intended by the user from being overwritten.

Figure 6:
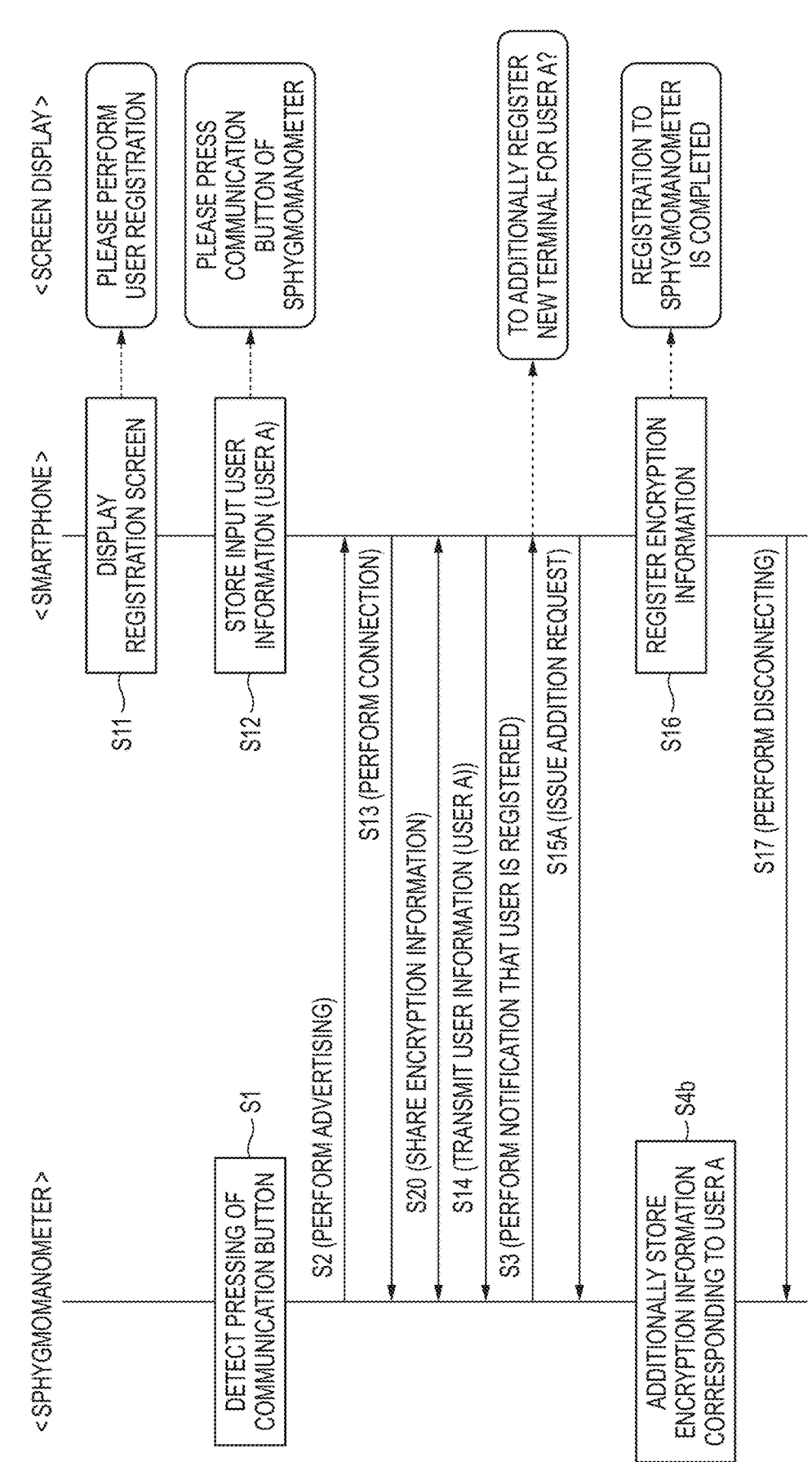
FIG. 6 is a sequence chart showing a modification of the procedure of the process when the user whose user information is stored in the sphygmomanometer 10 pairs the new smartphone 20G with the sphygmomanometer 10.

FIG. 6 is a sequence chart showing a modification of the procedure of the process when the user (user A) whose user information is stored in the sphygmomanometer 10 pairs the new smartphone 20G with the sphygmomanometer 10. Since the processes up to step S3 in FIG. 6 are the same as those in FIG. 4, the description thereof will be omitted.

The processor 21 of the smartphone 20G that receives the notification from the sphygmomanometer 10 in step S3 causes the display unit 25 to display, for example, a message "TO REGISTER NEW TERMINAL FOR USER A?". When the user who views this display performs an operation of instructing to add a terminal, the processor 21 of the smartphone 20G issues an addition request for encryption information corresponding to the user information "user A" to the sphygmomanometer 10 (step S15A).

The processor 11 of the sphygmomanometer 10 that receives the addition request stores the encryption information "INFG" shared in step S20 and the individual identification information "IDg" of the smartphone 20G in association with the user information "user A" stored in the storage unit 13.

On the other hand, after step S15A, the processor 21 of the smartphone 20G stores the encryption information "INFG" shared in step S20 and the sphygmomanometer individual identification information "IDA" in the storage unit 23 (step S16), and then disconnects the connection with the sphygmomanometer 10 (step S17).

Through the above process, the information stored in the storage unit 13 of the sphygmomanometer 10 is updated from the state shown in FIG. 3 to the state shown in FIG. 7. Accordingly, the encryption communication may be performed between the sphygmomanometer 10 and each of the smartphone 20A and the smartphone 20G. In this way, in the sphygmomanometer 10, a plurality of pieces of encryption information may be stored in association with the same user information. Therefore, even when the user A selectively uses the smartphone 20A and the smartphone 20G, the encryption communication may be performed between the sphygmomanometer 10 and each of the smartphone 20A and the smartphone 20G.

An operation will be described below when a new smartphone 20X is paired with the sphygmomanometer 10 in a case where the information stored in the storage unit 13 of the sphygmomanometer 10 is, for example, in the state shown in FIG. 7 and the storage unit 13 can only store up to five sets of user information, encryption information, and smartphone individual identification information.

FIG. 8 is a sequence chart showing a procedure of a process when the number of smartphones 20 exceeding a predetermined number are paired with the sphygmomanometer 10. Here, a case will be described as an example in which five smartphones 20A to 20D and 20G are already paired with the sphygmomanometer 10, and the user A further pairs his/her smartphone 20X with the sphygmomanometer 10. The number of smartphones 20 that may be registered in the sphygmomanometer 10 is five.

In FIG. 8, the processes up to step S14 are the same as those in FIG. 3. The processor 11 of the sphygmomanometer 10 that receives the user information "user A" in the process of step S14 notifies the smartphone 20X that the number of smartphones that can be registered will be exceeded (step S3A). The processor 11 of the sphygmomanometer 10 transmits the list of the user information stored in the storage unit 13 to the smartphone 20X together with the notification.

The processor 21 of the smartphone 20X that receives the notification causes the display unit 25 to display the list of the user information received from the sphygmomanometer 10, and causes the display unit 25 to display, for example, a message "THE NUMBER OF TERMINALS THAT CAN BE REGISTERED IN SPHYGMOMANOMETER HAS REACHED UPPER LIMIT. PLEASE DELETE UNNECESSARY INFORMATION" as shown in FIG. 8. When the user A performs an operation of selecting user information to be deleted according to the message, the processor 21 of the smartphone 20X issues a deletion request for the selected user information and information corresponding thereto to the sphygmomanometer 10 (step S15B).

The processor 11 of the sphygmomanometer 10 that receives the deletion request deletes the designated user information, and encryption information and smartphone individual identification information corresponding to the user information from the storage unit 13 (step S4c).

After deleting the information from the storage unit 13, the processor 11 of the sphygmomanometer 10 stores the encryption information shared in step S20 and individual identification information on the smartphone 20X in the storage unit 13 in association with the user information "user A" received in step S14.

In step S3A, not only the list of the user information but also the smartphone individual identification information may be transmitted to the smartphone 20, and the smartphone 20 may cause the display unit 25 to display a list of the user information and the smartphone individual identification information corresponding thereto. In this case, for example, the user A who owns the smartphone 20X selects an unnecessary one from the smartphone individual identification information corresponding to the user information on the user A. The processor 21 of the smartphone 20X issues a deletion request for the selected smartphone individual identification information and the corresponding set of the encryption information and the user information to the sphygmomanometer 10. In response to the deletion request, the processor 11 of the sphygmomanometer 10 may delete the set of the smartphone individual identification information selected by the user A and the corresponding encryption information and user information from the storage unit 13.

As described above, in the management system 100, when a capacity of the storage unit 13 is insufficient, for example, by designating user information to be deleted from the smartphone 20, encryption information and smartphone individual identification information corresponding to the user information may be deleted from the sphygmomanometer 10, and the new smartphone 20 may be paired with the sphygmomanometer 10. In a reference configuration in which no user information is stored in the storage unit 13 of the sphygmomanometer 10, a plurality of sets of encryption information and smartphone individual identification information are stored in the storage unit 13. In this case, even if a list of the sets of the encryption information and the smartphone individual identification information is presented to a user and the user is requested to designate which of the encryption information and the smartphone individual identification information is to be deleted, it is difficult for the user to determine who owns the smartphone 20 based only on the smartphone individual identification information, and it is difficult for the user to easily determine which encryption information and smartphone individual identification information is to be deleted. According to the management system 100, since the user information is stored in association with the encryption information and the smartphone individual identification information, the user may easily determine which information is to be deleted based on the presence of the user information, and may appropriately and easily manage the information in the storage unit 13 of the sphygmomanometer 10.

Assuming a case where the smartphone 20 is transferred to another user (user who jointly uses the sphygmomanometer 10) in a state where the pairing between the smartphone 20 and the sphygmomanometer 10 is completed, the user information registered in the sphygmomanometer 10 may be changed from the smartphone 20.

For example, it is assumed that the user A of the smartphone 20A having the individual identification information "IDa" is changed to another user X. In this case, when an operation to change the user information "user A" is performed, the processor 21 of the smartphone 20A updates the user information "user A" stored in the storage unit 23 to newly input user information "user X". The processor 21 transmits the new user information "user X" and the encryption information "INFA" stored in the storage unit 23 to the sphygmomanometer 10, and requests the sphygmomanometer 10 to change the user information corresponding to the encryption information "INFA". The processor 11 of the sphygmomanometer 10 that receives this request cancels the association between the encryption information "INFA" stored in the storage unit 13 and the corresponding user information "user A", and stores the new user information "user X" received from the smartphone 20A in association with the encryption information "INFA". Accordingly, a table stored in the sphygmomanometer 10 and the smartphone 20A is changed from the state shown in FIG. 3 to the state shown in FIG. 9.

In this way, the processor 11 of the sphygmomanometer 10 maintains the pair of the encryption information and the smartphone individual identification information, and updates only the user information corresponding to the pair from the user A to the user X. According to this configuration, in a case where the user of the smartphone 20 is changed, the encryption communication between the smartphone 20 and the sphygmomanometer 10 may be performed as described above by simply rewriting the user information. By updating the user information, a new user may appropriately and easily manage the encryption information.

The present disclosure includes following configurations.

(1) A measurement device (sphygmomanometer 10), including:

a short-range wireless communication interface (communication unit 12);

a processor (processor 11); and a storage (storage unit 13), in which in a state where a communication connection with an information terminal (smartphone 20) using short-range wireless communication is established, the processor receives, from the information terminal, user information specifying a user of the information terminal, shares, with the information terminal, encryption information for performing encryption communication using short-range wireless communication, and stores the encryption information and the user information in the storage in association with each other.

According to the configuration as in (1), since the user information and the encryption information are stored in association with each other, the encryption information may be managed on a user-by-user basis. For example, it is assumed that a first user changes a model from a first information terminal to a second information terminal, and first encryption information used between the first information terminal and the measurement device is stored in the measurement device in association with first user information specifying the first user. In this case, by designating the first user information from the second information terminal, the measurement device may replace the first encryption information corresponding to the designated first user information with second encryption information used between the second information terminal and the measurement device, or newly store the second encryption information in association with the designated first user information. Therefore, even when a capacity of the storage is limited, the encryption information may be appropriately edited according to an intention of the user, and the encryption information may be appropriately managed.

(2) The measurement device according to (1), in which
  when the processor receives, from an information terminal, information that is same as first user information stored in the storage and when the processor shares new encryption information with the information terminal, the processor replaces the encryption information corresponding to the first user information with the new encryption information shared with the information terminal.

According to the configuration as in (2), even when the capacity of the storage is limited and the capacity is exhausted, new encryption information is overwritten on old encryption information corresponding to the user information, and thus it is possible to prevent the encryption information used for encryption communication with another information terminal from being unintentionally deleted.

(3) The measurement device according to (1) or (2), in which
  when the processor receives, from an information terminal, information that is same as first user information stored in the storage, when the processor shares new encryption information with the information terminal, and when the processor receives, from the information terminal, a request to additionally register the new encryption information for the first user information, the processor stores the new encryption information in the storage in association with the first user information.

According to the configuration as in (3), a plurality of pieces of encryption information may be stored in association with the same user information, and thus even when one user selectively uses a plurality of information terminals, encryption communication may be performed between the plurality of information terminals and the measurement device.

(4) The measurement device according to any one of (1) to (3), in which
  when the processor receives a deletion request for user information stored in the storage from an information terminal, the processor deletes the user information and the encryption information corresponding to the user information.

According to the configuration as in (4), the encryption information may be deleted on a user-by-user basis, and thus the encryption information may be easily managed.

(5) The measurement device according to any one of (1) to (4), in which
  when the processor receives, from an information terminal, a change request for user information stored in the storage, the processor changes the user information to designated information.

According to the configuration as in (5), even when the information terminal is transferred to another user, the encryption information may be easily managed.

According to the above configurations, it is possible to appropriately manage the encryption information.

Although various embodiments have been described above, it goes without saying that the present invention is not limited to these examples. It is apparent to those skilled in the art that various changes or modifications may be conceived within the scope described in claims, and it is understood that the changes or modifications naturally fall within the technical scope of the present invention. In addition, the components described in the above embodiment may be freely combined without departing from the spirit of the invention.

What is claimed is:

1. A measurement device, comprising:

a short-range wireless communication interface;

a processor; and a storage, wherein in a state where a communication connection with an information terminal using short-range wireless communication is established, the processor receives, from the information terminal, user information specifying a user of the information terminal, shares, with the information terminal, encryption information for performing encryption communication using short-range wireless communication, and stores the encryption information and the user information in the storage in association with each other.

2. The measurement device according to claim 1, wherein when the processor receives, from an information terminal, information that is same as first user information stored in the storage and when the processor shares new encryption information with the information terminal, the processor replaces the encryption information corresponding to the first user information with the new encryption information shared with the information terminal.

3. The measurement device according to claim 1, wherein when the processor receives, from an information terminal, information that is same as first user information stored in the storage, when the processor shares new encryption information with the information terminal, and when the processor receives, from the information terminal, a request to additionally register the new encryption information for the first user information, the processor stores the new encryption information in the storage in association with the first user information.

4. The measurement device according to claim 1, wherein when the processor receives a deletion request for user information stored in the storage from an information terminal, the processor deletes the user information and the encryption information corresponding to the user information.

5. The measurement device according to claim 1, wherein when the processor receives, from an information terminal, a change request for user information stored in the storage, the processor changes the user information to designated information.

\* \* \* \* \*